US009933539B2

United States Patent
Miyashita (10) Patent No.: US 9,933,539 B2
(45) Date of Patent: Apr. 3, 2018

(54) FOREIGN OBJECT DETECTION DEVICE, FOREIGN OBJECT DETECTION METHOD, AND NON-CONTACT CHARGING SYSTEM

(71) Applicant: Panasonic Intellectual Property Management Co., Ltd., Osaka (JP)

(72) Inventor: Norihiro Miyashita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 185 days.

(21) Appl. No.: 14/830,691

(22) Filed: Aug. 19, 2015

(65) Prior Publication Data

US 2015/0355360 A1 Dec. 10, 2015

Related U.S. Application Data (63) Continuation of application No. PCT/JP2014/000832, filed on Feb. 18, 2014.

(30) Foreign Application Priority Data

Feb. 19, 2013 (JP) .................................. 2013-029602

(51) Int. Cl.
*H02J 7/00* (2006.01)
*G01V 3/10* (2006.01)
(Continued)

(52) U.S. Cl.
CPC ................ *G01V 3/10* (2013.01); *H02J 5/005* (2013.01); *H02J 7/025* (2013.01); *H02J 17/00* (2013.01); *H02J 50/10* (2016.02); *H02J 50/60* (2016.02)

(58) Field of Classification Search
USPC ......................................................... 320/108
See application file for complete search history.

(56) References Cited

U.S. PATENT DOCUMENTS 6,107,924 A 8/2000 Kasai et al.
6,545,614 B1 4/2003 Kasai
(Continued)

FOREIGN PATENT DOCUMENTS

JP 3-194817 A 8/1991
JP 9-43007 A 2/1997
(Continued)

OTHER PUBLICATIONS

International Search Report issued in Application No. PCT/JP2014/000832 dated Mar. 18, 2014, with English Translation.
(Continued)

*Primary Examiner* — Samuel Berhanu
(74) *Attorney, Agent, or Firm* — McDermott Will & Emery LLP (57) ABSTRACT

A foreign object detector includes a detection coil; a transmitting circuit generating an unbalanced signal; a balanced-to-unbalanced transformer transforming the unbalanced signal supplied from the transmitting circuit to a balanced signal; and detection circuit detecting a foreign object by sensing a change in frequency characteristic of reflected power that is a power component reflected by the detection coil. The foreign object detector detects a foreign object while preventing a wire between the detection coil and the detection circuit from functioning as a linear antenna even if the wire is long.

4 Claims, 11 Drawing Sheets

(51) Int. Cl.
*H02J 5/00* (2016.01)
*H02J 50/10* (2016.01)
*H02J 50/60* (2016.01)
*H02J 17/00* (2006.01)
*H02J 7/02* (2016.01)

(56) References Cited

U.S. PATENT DOCUMENTS

| | | | |
|---|---|---|---|
| 8,552,685 B2 * | 10/2013 | Kanno | B60L 5/005 |
| | | | 320/108 |
| 2007/0139152 A1 * | 6/2007 | Chan | H01F 27/326 |
| | | | 336/208 |
| 2011/0074346 A1 | 3/2011 | Hall et al. | |
| 2012/0001493 A1 | 1/2012 | Kudo et al. | |
| 2013/0099592 A1 | 4/2013 | Abe | |
| 2013/0169062 A1 | 7/2013 | Maikawa et al. | |

FOREIGN PATENT DOCUMENTS

| | | |
|---|---|---|
| JP | 11-304764 A | 11/1999 |
| JP | 2000-031808 A | 1/2000 |
| JP | 2000-098048 A | 4/2000 |
| JP | 2012-016125 A | 1/2012 |
| JP | 2012-016171 A | 1/2012 |
| JP | 2012-249401 A | 12/2012 |
| WO | 2012/173128 A1 | 12/2012 |

OTHER PUBLICATIONS

English translation of Chinese Search Report dated Mar. 30, 2017 issued in Chinese Patent Application No. 201480008199.0.

* cited by examiner

— WHEN THERE IS NEITHER A FOREIGN
OBJECT NOR RAIN WATER
---- WHEN THERE IS A FOREIGN OBJECT (METAL)
······ WHEN THERE IS RAIN WATER

FIG.11A WHEN THERE IS NEITHER A FOREIGN OBJECT NOR RAIN WATER

FIG.11B WHEN THERE IS A FOREIGN OBJECT (METAL)

FIG.11C WHEN THERE IS RAIN WATER

FIG.12A WHEN THERE IS NEITHER A FOREIGN OBJECT NOR RAIN WATER

FIG.12B WHEN THERE IS A FOREIGN OBJECT (METAL)

FIG.12C WHEN THERE IS RAIN WATER

FIG.13A WHEN THERE IS NEITHER A FOREIGN OBJECT NOR RAIN WATER

FIG.13B WHEN THERE IS A FOREIGN OBJECT (METAL)

FIG.13C WHEN THERE IS RAIN WATER

FOREIGN OBJECT DETECTION DEVICE, FOREIGN OBJECT DETECTION METHOD, AND NON-CONTACT CHARGING SYSTEM

CROSS-REFERENCE TO RELATED APPLICATIONS

This is a continuation of International Application No. PCT/JP2014/000832 filed on Feb. 18, 2014, which claims priority to Japanese Patent Application No. 2013-029602 filed on Feb. 19, 2013. The entire disclosures of these applications are incorporated by reference herein.

BACKGROUND

The present disclosure relates to a foreign object detector, a method of detecting a foreign object, and a non-contact charging system.

In recent years, wireless power transmission systems (i.e., non-contact charging systems) have been, and are being, developed to charge, for example, electric vehicles via a non-contact method. In each wireless power transmission system, a transmitting' coil and an RF oscillation source are provided for a charger, and a receiving coil is provided for an electric vehicle. Some wireless power transmission systems using an electromagnetic induction method enable high-efficiency non-contact power transmission.

Such a wireless power transmission system using the electromagnetic induction method is designed to transmit a large quantity of electric power. Therefore, if a metallic foreign object enters the gap between its transmitting and receiving coils and/or its environment, there is a risk that the system would generate heat. In view of this consideration, it is thus important, for safety reasons, to detect such a metallic foreign object before or during charging.

As a conventional method of detecting a foreign object in a wireless power transmission system, there is a method of detecting a change in the inductance of a detection coil to be caused by electromagnetic induction between the metal and the detection coil (see, e.g., Japanese Unexamined Patent Publication No. 2012-16125).

If a plurality of detection coils are arranged near the transmitting coil to detect a metallic foreign object on and/or around the transmitting coil, an AC magnetic field generated by the transmitting coil induces a high voltage in the detection coils. This results in breakdown or malfunction of a detection circuit.

An RF oscillation source of a charger is generally configured as an inverter circuit to output a large quantity of electric power. Since the inverter circuit makes switching using a square wave, not only a voltage of the oscillation frequency but also a voltage with a frequency component that is sufficiently higher than the oscillation frequency, such as that of switching noise, are induced in the detection coils. In Japanese Unexamined Patent Publication No. 2012-16125, the frequency utilized in detecting the metal is set to be higher than that of a magnetic field generated by the transmitting coil to reduce the influence on the detection.

SUMMARY

However, in the method of Japanese Unexamined Patent Publication No. 2012-16125, if the frequency component of the voltage induced in the detection coils reaches an extremely high frequency range, and if the frequency utilized to detect the metal is set to be higher than that of the magnetic field generated by the transmitting coil, the wavelength of the frequency utilized to detect the metal becomes much shorter. As a result, the length of the wires between the detection coils and the detection circuit increases electromagnetically such that the wires function as a linear antenna such as a dipole antenna.

This leads to the problem of causing a decline in foreign object detecting performance due to a decrease in the Q factor involved with an increase in the radiation resistance of the detection coils, or the problem of failing to detect a foreign object, since the detection coils do not properly function as an inductor.

A transmitting coil for use to charge an electric vehicle has so large a size (e.g., diameter if the coil is in a circular shape) that there is a need to arrange a lot of detection coils. At this time, the length of wires between the detection coils and the detection circuit increases physically. In this case, as well, the wires function as a linear antenna such as a dipole antenna to cause a similar problem to what has been described above.

In view of the problems described above, it is therefore an object of the present disclosure to provide a foreign object detector, method of detecting a foreign object, and non-contact charging system which prevents wires between detection coils and a detection circuit from functioning as a linear antenna even if the wires are long, and which detects a foreign object reliably.

In order to solve the problem described above, a foreign object detector according to the present disclosure includes: a detection coil; a transmitting circuit generating an unbalanced signal; a balanced-to-unbalanced transformer transforming the unbalanced signal supplied from the transmitting circuit to a balanced signal; and a detection circuit detecting a foreign object by sensing a change in frequency characteristic of reflected power that is a power component reflected by the detection coil.

A method of detecting a foreign object according to the present disclosure includes transforming an unbalanced signal to a balanced signal and supplying power of the balanced signal to a detection coil; and detecting the foreign object by sensing a change in frequency characteristic of reflected power that is a power component reflected by the detection coil.

According to the present disclosure, a foreign object is detected reliably with wires between detection coils and a detection circuit prevented from functioning as a linear antenna, even if the wires are long.

BRIEF DESCRIPTION OF THE DRAWINGS

FIGS. 11A-11C illustrate the frequency characteristic of reflected power of a coil L1 where there is no mutual coupling between the coils L1 and L2 shown in FIG. 10.

FIGS. 12A 2C illustrate the frequency characteristic of reflected power of a coil L1 where mutual coupling between the coils L1 and L2 shown in FIG. 10 is taken into consideration and where no short circuit is used.

FIGS. 13A-13C illustrate the frequency characteristic of reflected power of a coil L1 where mutual coupling between the coils L1 and L2 of FIG. 10 is taken into consideration and where a short circuit is used.

DETAILED DESCRIPTION

Embodiments of a foreign object detector, method of detecting a foreign object, and non-contact charging system according to the present disclosure will now be described with reference to the drawings. These embodiments are not intended to limit the scope of the present disclosure. Those skilled in the art would readily understand that those embodiments may also be expressed in a similar language or depicted similarly in the same or similar technical fields.

Figure 1:
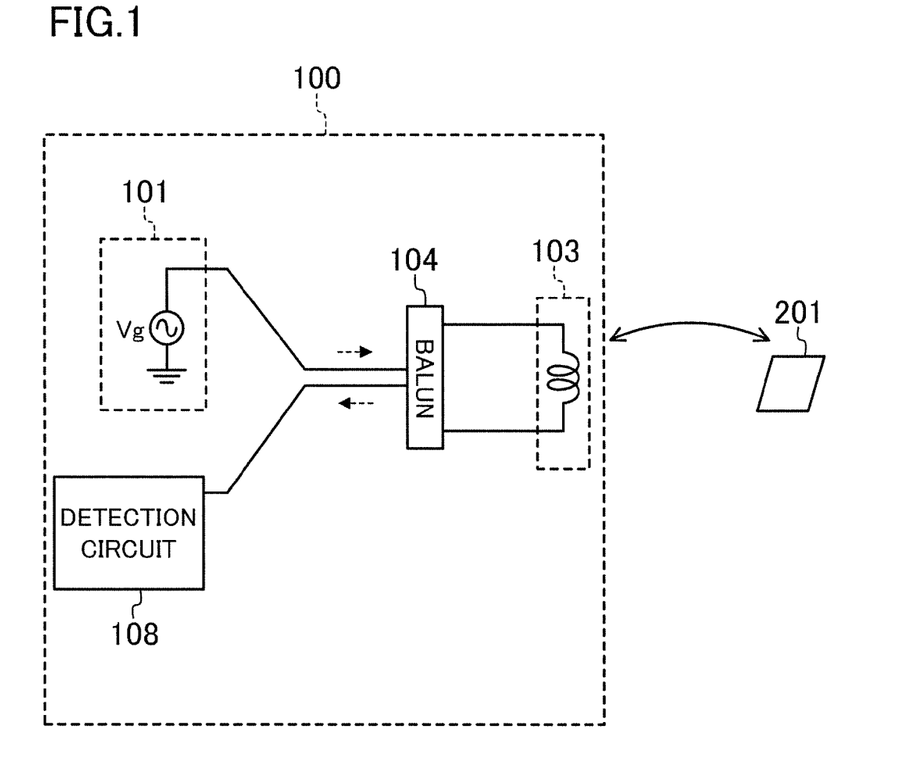
FIG. 1 is a block diagram illustrating a basic configuration of a foreign object detector according to the present disclosure.

FIG. 1 illustrates a basic configuration of a foreign object detector 100 according to the present disclosure. A transmitting circuit 101 generates an unbalanced signal using a voltage source Vg, and outputs the unbalanced signal to a balanced-to-unbalanced transformer (balun) 104. The balun 104 transforms the unbalanced signal supplied from the transmitting circuit 101 to a balanced signal, and outputs the balanced signal to the detection coil 103. A detection circuit 108 detects a foreign object by sensing a change in the frequency characteristic of reflected power, which is a power component reflected by the detection coil 103. Specifically, the detection circuit 108 detects a foreign object based on the amount of change in the matching frequency of the reflected power.

This configuration allows for preventing wires between the detection coils 103 and the detection circuit 108 from functioning as a linear antenna even if the wires are long, and detecting the metallic foreign object 201. This thus prevents degradation in accuracy in detecting a foreign object.

First Embodiment

Figure 2:
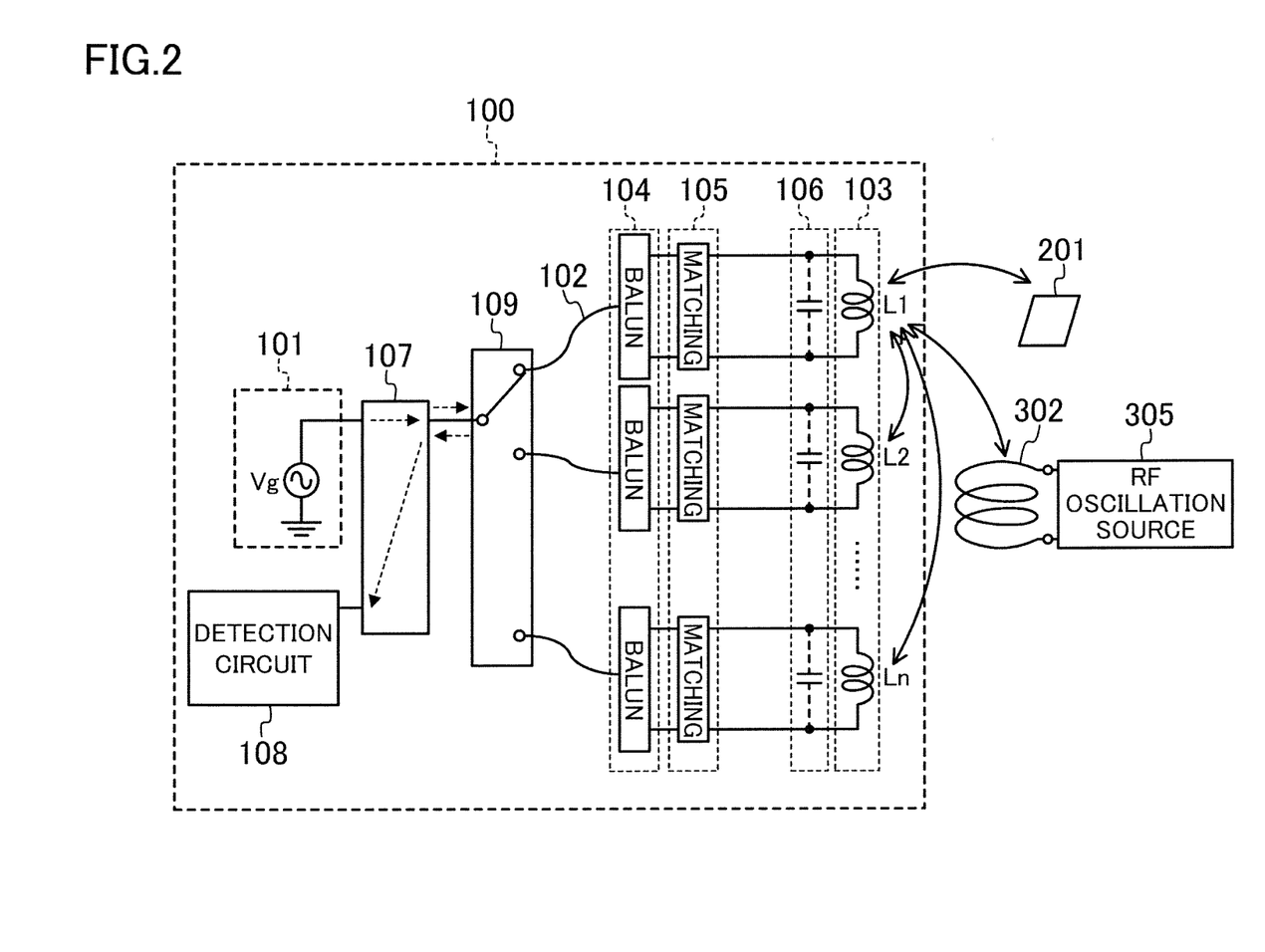
FIG. 2 illustrates a detailed configuration of a foreign object detector according to a first embodiment of the present disclosure.

FIG. 2 illustrates a detailed configuration of a foreign object detector 100 according to a first embodiment. A transmitting circuit 101 generates RF power of a predetermined frequency, and outputs the RF power to detection coils 103, which will be described later, via coaxial cables 102. Each coaxial cable 102 transmits an unbalanced RF signal. Each coaxial cable 102 is a transmission line including a center conductor shielded with an external conductor. Each detection coil 103 generates an RF magnetic field to detect the metallic foreign object 201. The detection coils 103 form an arrangement of n coils L1, L2, . . . , and Ln (where n is an integer equal to or greater than two).

Each balun 104 is connected to a matching circuit 105, which will be described later, and the coaxial cable 102. The balun 104 transforms an unbalanced signal supplied from the coaxial cable 102 to a balanced signal and outputs the balanced signal to the matching circuit 105.

Each matching circuit 105 performs impedance matching between the associated detection coil 103 and balun 104. The matching circuit 105 converts the impedance of the detection coil 103 at a predetermined matching frequency f0 to match the impedance with the balanced impedance of the balun 104.

The closer the point of connection between the balun 104 and the matching circuit 105 to the detection coil 103 is, the better. As will be described later, the detector according to the present disclosure detects a foreign object by sensing a change in the frequency characteristic responding to a change in the inductance of the detection coil 103 that has been caused by a target to be detected. However, if the detection coil 103 is connected to the balun 104 and the matching circuit 105 via a long wire, the wire comes to have an inductance component to reduce the amount of change in the inductance of the detection coil 103 caused by the target to be detected. Thus, the balun 104 and the matching circuit 105 are connected at a closest possible point to the detection coil 103, which allows for reducing deterioration in the foreign object detecting performance.

A parasitic capacitor 106 is parasitic capacitance generated by each detection coil 103. In the equivalent circuit, capacitance components are defined in parallel with the respective detection coils 103. If a dielectric exists near the detection coils 103, the capacitance value of the parasitic capacitor 106 increases. Examples of the dielectric include a transmitting coil case, which will be described later, and rainwater on the transmitting coil case.

The directional coupler 107 outputs an unbalanced signal, which is RF power supplied from the transmitting circuit 101, to the balun 104, extracts a power component reflected by the detection coil 103, and outputs the power component to the detection circuit 108, which will be described later.

The detection circuit 108 receives the reflected power extracted by the directional coupler 107, and detects a foreign object based on the amount of change in the matching frequency at which the minimum power is reflected.

Out of the coils L1, L2, . . . , and Ln arranged as the detection coils 103, the switch circuit 109 turns itself by selecting one of the coils to be supplied with power.

The foreign object detector 100 described above is combined with a transmitting coil 302 and an RF oscillation source 305 to form a non-contact charging system. The RF oscillation source 305 supplies RF power of a predetermined frequency to the transmitting coil 302 to start non-contact charging.

Figure 3:
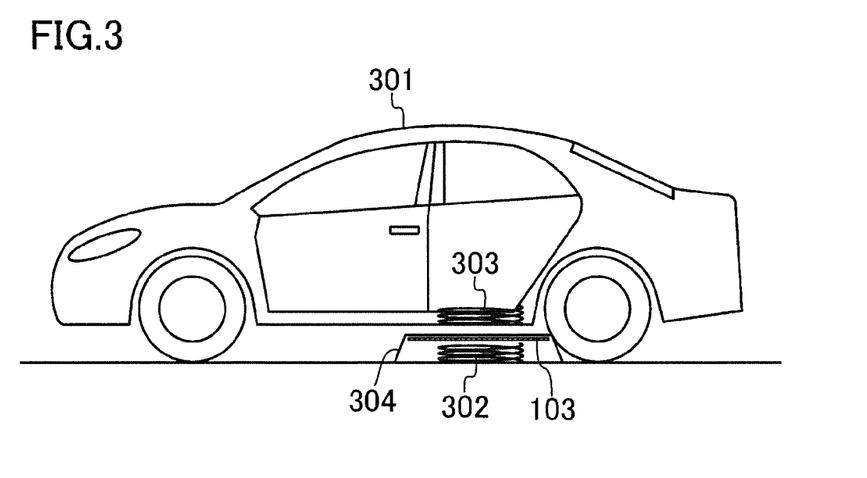
FIG. 3 is a front view illustrating an example where a wireless power transmission system is employed in a vehicle.

FIG. 3 is a front view illustrating an example where a wireless power transmission system is employed in a vehicle 301. In the example of FIG. 3, the transmitting coil 302 is placed on the ground, and a receiving coil 303 is mounted on the vehicle 301. The transmitting coil case 304 is, for example, a resin dielectric, and houses the transmitting coil 302. The detection coils 103 are arranged above the transmitting coil 302, and housed in the transmitting coil case 304.

Figure 4:
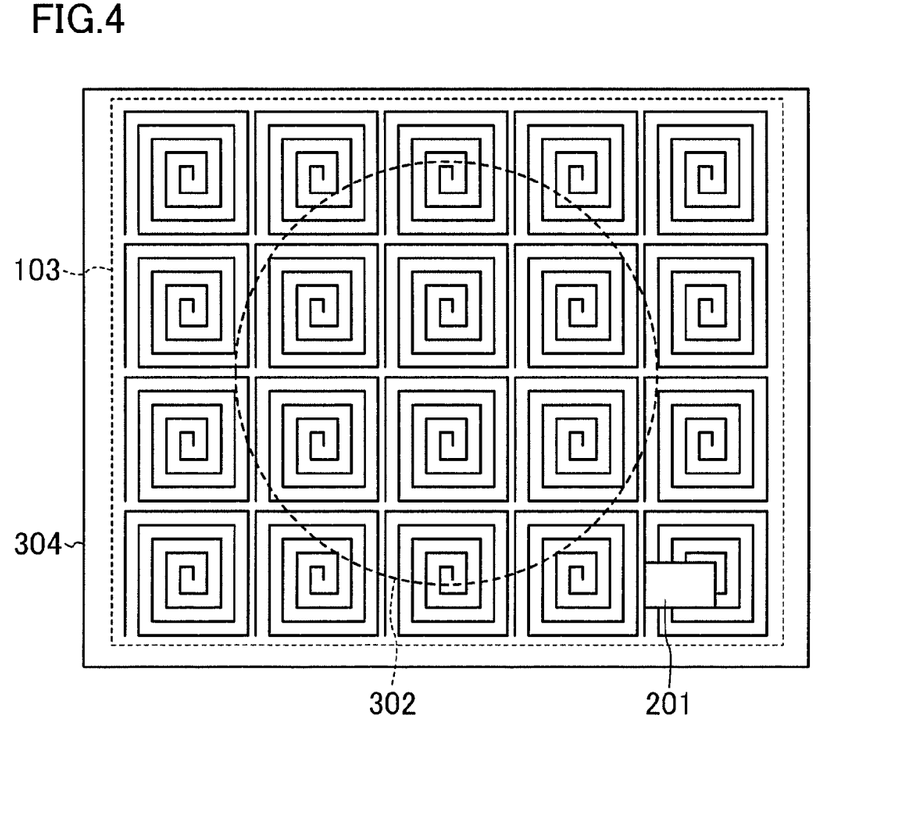
FIG. 4 is an enlarged plan view of the transmitting coil case shown in FIG. 3.

FIG. 4 is an enlarged plan view of the transmitting coil case 304. In order to detect a foreign object on and/or around the transmitting coil 302, the detection coils 103 are arranged so as to cover the transmitting coil 302 and its surroundings without leaving any space between them. These detection coils 103 are switched by the switch circuit 109 to detect the metallic foreign object 201 on and/or around the transmitting coil 302.

In FIG. 2, magnetic field coupling occurs not only between the detection coils 103 and the metallic foreign object 201 but also between the detection coils 103 and the transmitting coil 302. The detection coils 103 induce currents in the transmitting coil 302. If magnetic field coupling occurs between the detection coils 103 and the transmitting coil 302, a change in received power caused by the metallic foreign object 201 decreases so much as to deteriorate the foreign object detecting performance.

Figure 5:
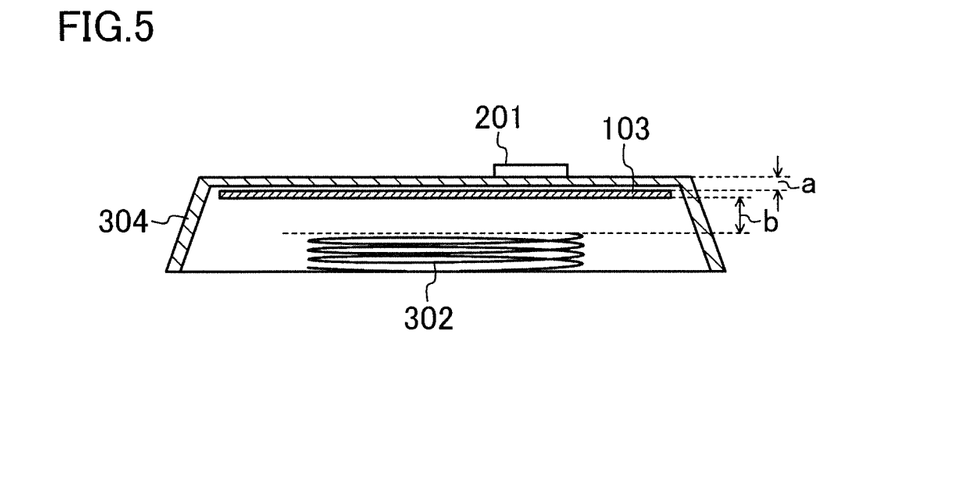
FIG. 5 is an enlarged cross-sectional view of the transmitting coil case shown in FIG. 3.

FIG. 5 is an enlarged cross-sectional view of the transmitting coil case 304. Assume that the distance between the metallic foreign object 201 and the detection coil 103 (e.g., the distance between the (external) surface of the transmitting coil case 304 and (the top surface of) the detection coils 103) is "a," and the distance between the transmitting coil 302 and the detection coils 103 (e.g., the distance between the upper surface of the transmitting coil 302 and the lower surface of the detection coils 103) is "b." The detection coils 103 are suitably arranged so that the distance "a" is shorter than the distance "b" to reduce the influence of magnetic field coupling between the detection coils 103 and the transmitting coil 302. This configuration allows for reducing influence of magnetic field coupling between the detection coils 103 and the transmitting coil 302, thereby reducing deterioration in the foreign object detecting performance.

A method of detecting a foreign object using the foreign object detector 100 configured as described above will now be outlined. An unbalanced signal is transformed to a balanced signal such that power is supplied to the detection coil 103. A foreign object is detected by sensing a change in the frequency characteristic of the power reflected by the detection coil 103

Figure 6:
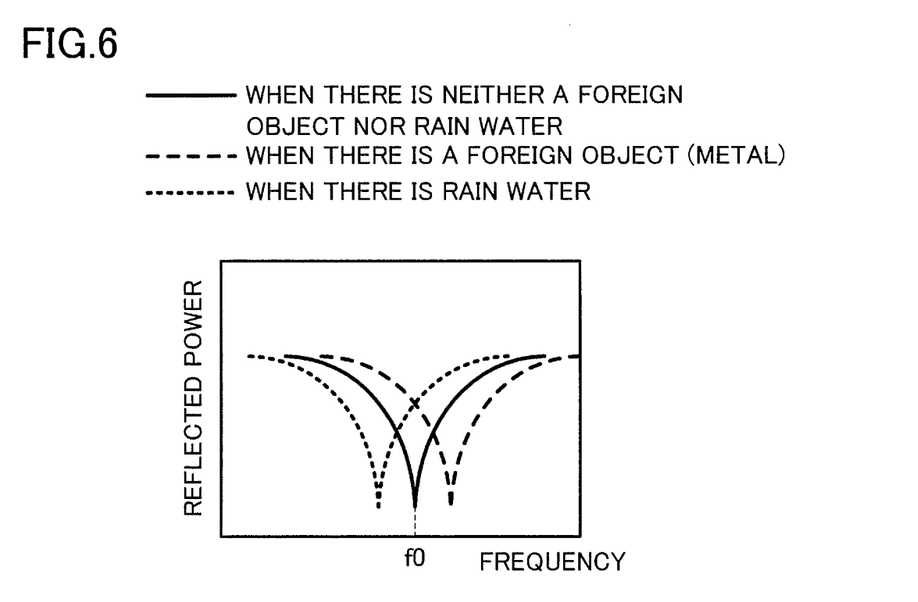
FIG. 6 illustrates a change in the frequency characteristic of reflected power caused by a foreign object according to the present disclosure.

FIG. 6 illustrates a change in the frequency characteristic of the reflected power caused by a foreign object. Since an electric vehicle is sometimes charged while being parked outside, such a foreign object needs to be detected regardless of the weather. Specifically, even if it rains, it is necessary to detect the foreign object without being affected by the rainwater, that is, to distinguish the metal from the water.

If the metallic foreign object 201 exists near the detection coils 103, electromagnetic induction is generated between the detection coils 103 and the metallic foreign object 201 to cause a decrease in the inductance of the detection coils 103. As a result, the matching frequency increases as compared to a case where there is no metallic foreign object 201.

On the other hand, if rainwater exists near the detection coil 103, capacitance coupling occurs between the detection coils 103 and the rainwater to increase the capacitance value of the parasitic capacitors 106 of the detection coils 103, because rainwater has a high dielectric constant. As a result, the matching frequency decreases as compared to a case where there is no rainwater.

The detection circuit 108 detects the metallic foreign object 201 distinctively from rainwater by sensing such a change in matching frequency. A matching frequency f0 when neither a metallic foreign object 201 nor rainwater exists is regarded to as a reference value. If the matching frequency of the reflected power is higher than the reference matching frequency f0, the detection circuit 108 determines that there is the metallic foreign object 201 near the detection coils 103. On the other hand, if the matching frequency of the reflected power is lower than the reference matching frequency f0, the detection circuit 108 determines that there is rainwater near the detection coils 103.

The reference matching frequency f0 may be initially set when the foreign object detector 100 according to the present disclosure is installed. At that time, it may be confirmed visually, or checked in advance by another detector, that there is neither a metallic foreign object, for example, nor rainwater there. Alternatively, the reference matching frequency f0 may be set at the time of shipment of the foreign object detector 100 according to the present disclosure.

Next, it will be described how to reduce the influence of the length of the wires. During charging, an AC magnetic field generated by the transmitting coil 302 induces a high voltage in the detection coils 103. This high induced voltage could cause breakdown in the circuits connected to the detection coils 103. If the frequency of the RF power output from the transmitting circuit 101 to detect a foreign object is increased to avoid such a breakdown, the wavelength of the RF power becomes shorter. As a result, the length of the wires supplying the power to the detection coils 103 increases electromagnetically.

At this time, the wires function as a linear antenna such as a dipole antenna. Then, the radiation resistance of the detection coils 103 increases, and the Q factor of the detection coils 103 decreases, so much as to deteriorate the foreign object detecting performance. That is, since the detection coils 103 do not function as inductors, no foreign objects are detectable, which is a problem.

In particular, the transmitting coil 302 utilized for charging an electric vehicle has so large a size (e.g., diameter if the coil is in a circular shape) that there is a need to arrange a lot of detection coils 103. In this case, the length of the wires increases physically.

In order to address this problem, the method employed in the foreign object detector 100 of FIG. 2 according to the present disclosure is to connect the detection coils 103 to the respective circuits via the coaxial cables 102, which greatly reduces leakage electromagnetic fields, and to detect a foreign object based on the frequency characteristic of the power reflected by the detection coils 103. Furthermore, balanced power is supplied to the detection coils 103 via the respective balun 104 to reduce leakage currents induced on outer conducting shields of the coaxial cables 102. With this configuration, the power being supplied to the detection coils 103 is transmitted through the outer conducting shields of the coaxial cables 102 to prevent the coaxial cables 102 from functioning as a linear antenna even if the coaxial cables 102 are electromagnetically long.

Second Embodiment

Now, it will be described how to prevent the circuits from causing breakdown in a foreign object detector 200 shown in FIG. 7.

As shown in FIG. 2, the foreign object detector 100, the transmitting coil 302, and the RF oscillation source 305, which have been described in the first embodiment, are combined to form a non-contact charging system. The RF oscillation source 305 supplies RF power of a predetermined frequency to the transmitting coil 302 to start non-contact charging.

The RF oscillation source 305 transmits a large quantity of electric power. Thus, at occurrence of magnetic field coupling between the detection coils 103 and the transmitting coil 302, that large quantity of electric power is supplied to the transmitting circuit 101, the detection circuit 108, and the switch circuit 109 to incur the risk of causing breakdown in these circuits. In order to address this problem, the frequency of the RF power supplied from the transmitting circuit 101 is set to be higher than the frequency of the RF power supplied from the RF oscillation source 305.

Figure 7:
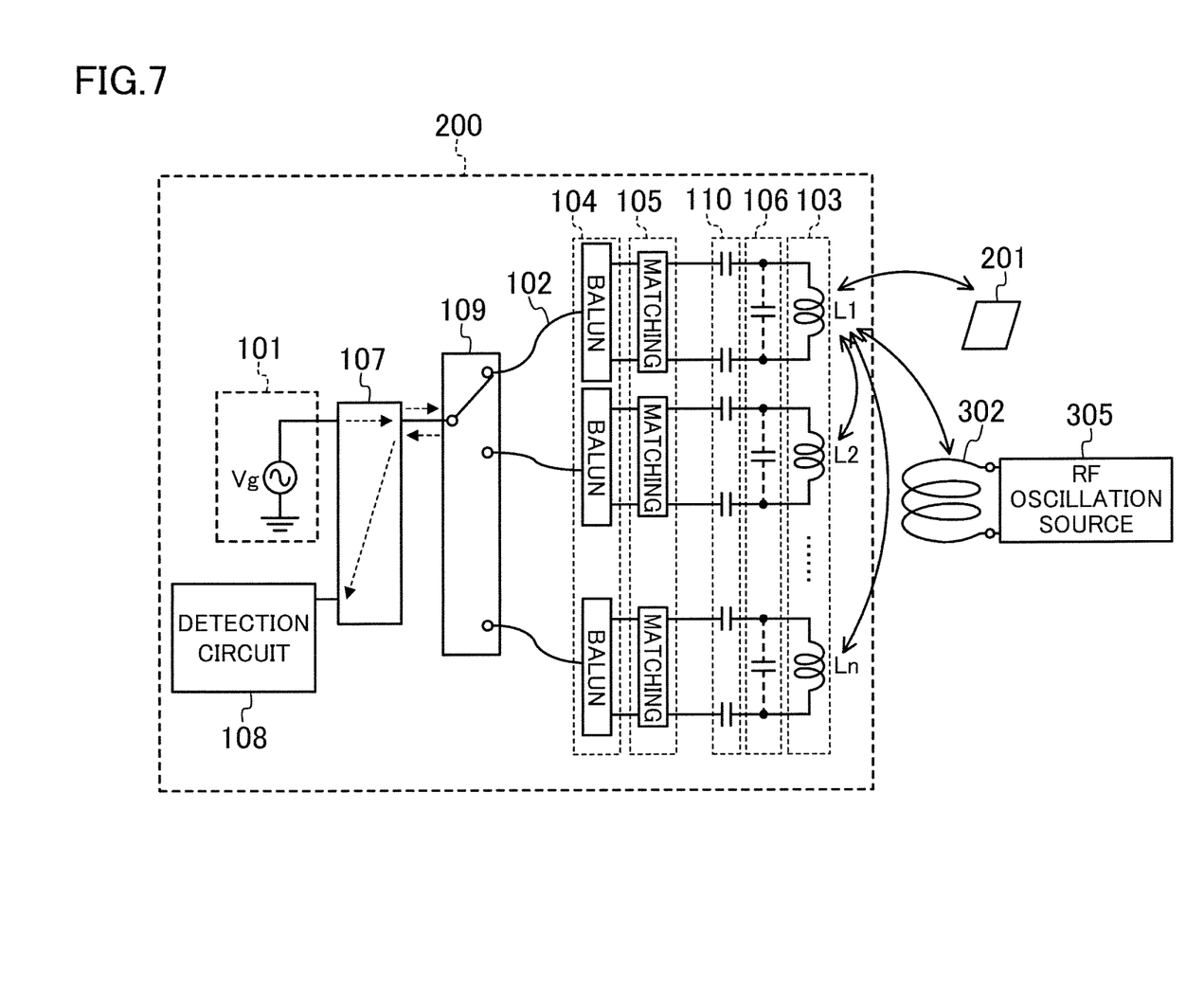
FIG. 7 illustrates a detailed configuration of a foreign object detector according to a second embodiment of the present disclosure.

As shown in the foreign object detector 200 of FIG. 7, a circuit protection filter 110 is arranged, for example, between each matching circuit 105 and its associated parasitic capacitor 106 and connected to its associated detection coil 103. The circuit protection filter 110 is a filter circuit with the characteristic of allowing the frequency of the RF power supplied from the transmitting circuit 101 to pass, and cutting the frequency of the RF power supplied from the RF oscillation source 305. This configuration protects the transmitting circuit 101, the detection circuit 108, the switch circuit 109, and other circuits and elements. FIG. 7 illustrates an example where capacitors functioning as high-pass filters are connected to both terminals of the detection coils 103.

As shown in FIG. 4, the size of each detection coil 103 (e.g., its diameter if the coil is in a circular shape) is set smaller than the size of the transmitting coil 302 (e.g., its diameter if the coil is in a circular shape). This configuration reduces the degree of the magnetic field coupling between the detection coils 103 and the transmitting coil 302 and thereby reduces the power supplied to the transmitting circuit 101, the detection circuit 108, and the switch circuit 109.

Third Embodiment

Now, it will be described how to reduce mutual coupling between the respective detection coils 103 in a foreign object detector 300 shown in FIG. 8.

As shown in FIG. 4, since the plurality of detection coils 103 are arranged close to each other, mutual coupling occurs between them. In FIG. 2, when the coil L1 is selected among the detection coils 103, the non-selected coils other than L1 are coupled to the coil L1, which induces currents. As a result, a change in received power caused by the metallic foreign object 201 decreases so much as to deteriorate the foreign object detecting performance.

Figure 8:
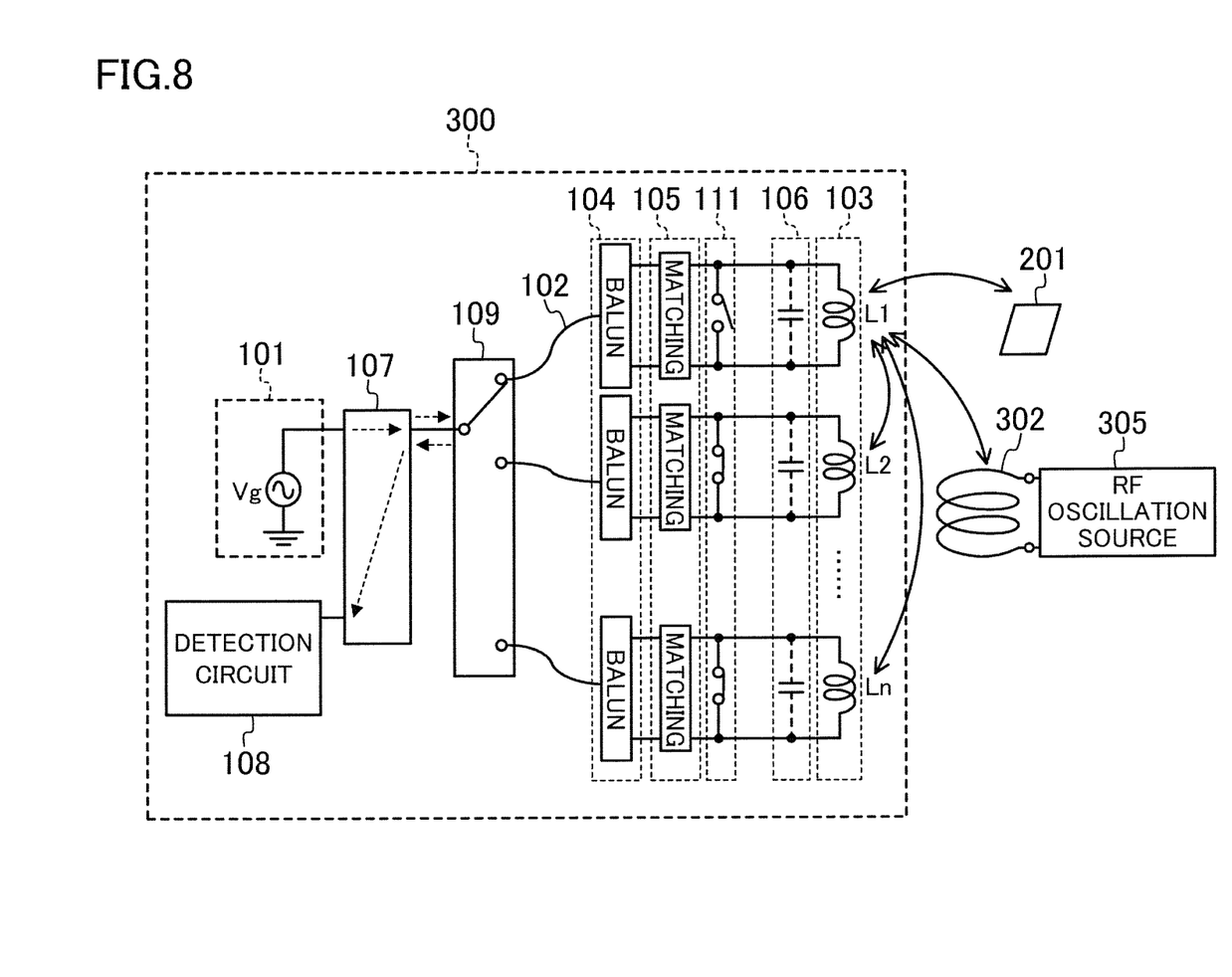
FIG. 8 illustrates a detailed configuration of a foreign object detector according to a third embodiment of the present disclosure.

Thus, according to this embodiment, as shown in FIG. 8, the two terminals of each of those non-selected detection coils 103 are short-circuited together by an associated short circuit 111. In the embodiment illustrated in FIG. 8, each short circuit 111 is provided between its associated matching circuit 105 and parasitic capacitor 106.

Then, the impedance of the non-selected detection coils 103 changes so greatly as to cause impedance mismatch between the detection coils 103 and the respective baluns 104. This allows for preventing currents from being induced in the non-selected detection coils 103 due to their mutual coupling.

Figure 9:
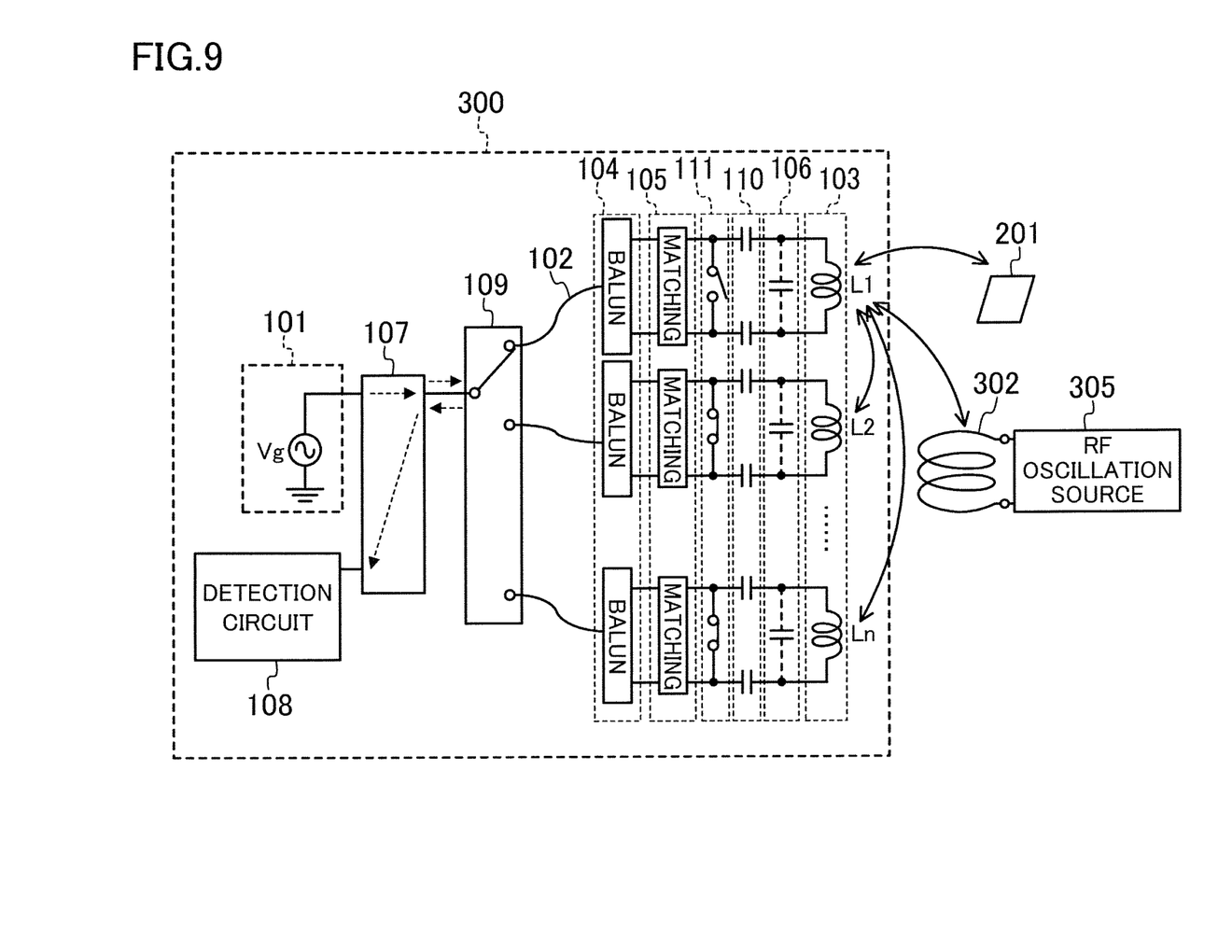
FIG. 9 illustrates a detailed configuration of a foreign object detector according to a variation of FIG. 8.

Alternatively, as in the foreign object detector 300 shown in FIG. 9, each short circuit 111 may be connected to an associated detection coil 103 with a circuit protection filter 110 interposed therebetween. That is, the short circuit 111 may be provided between the circuit protection filter 110 and an associated matching circuit 105. This configuration allows for preventing the short circuits 111 from being broken down due to a large voltage induced in the detection coils 103 by an AC magnetic field generated by the transmitting coil 302.

Effective improvement in foreign object detecting performance owing to such reduction in mutual coupling will now be described based on the results of calculation obtained by an equivalent circuit.

Figure 10:
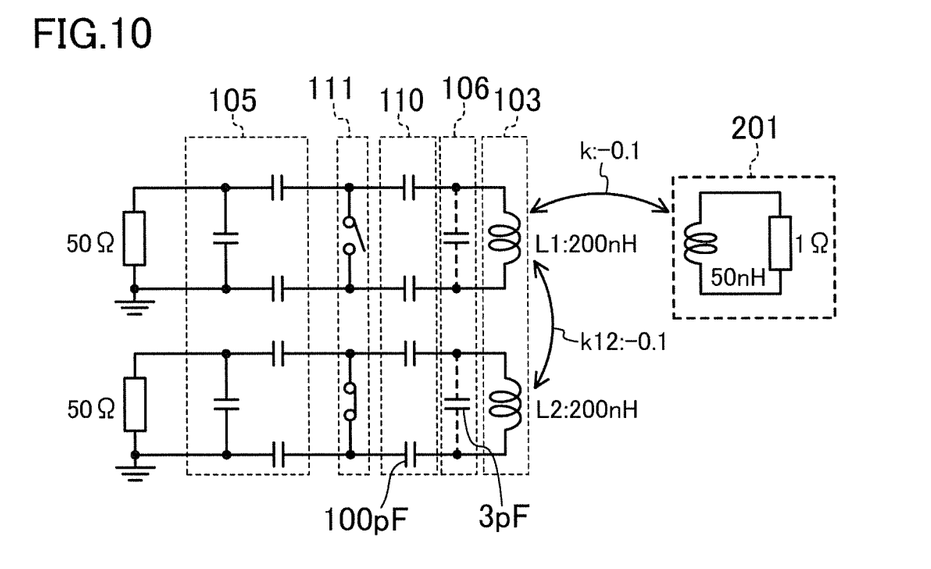
FIG. 10 illustrates an equivalent circuit model of the foreign object detector of FIG. 9.

FIG. 10 is an equivalent circuit model of the foreign object detector 300 of FIG. 9. The elements falling in the range from the detection coil 103 to the matching circuit 105 are represented by their equivalent circuit. The metallic foreign object 201 is represented by a series circuit comprised of a resistor and an inductor. The calculation was performed based on the assumption that if there was the metallic foreign object 201 near the coil L1, magnetic field coupling with a coupling coefficient k ($=-0.1$) would occur between the inductor of the metallic foreign object 201 and the coil L1. On the other hand, the calculation was also performed based on the assumption that if there was rainwater near the coil L1 the parasitic capacitor 106 associated with the coil L1 would increase via capacitance coupling.

The matching circuit 105 is comprised of capacitors connected in series/parallel. The calculation was performed based on the assumption that balanced impedance of the balun 104 was 50Ω, and the detection coils 103 were comprised of the coils L1 and L2. The reference matching frequency f0 where there was no foreign object was adjusted to 170 MHz.

Figure 11A:
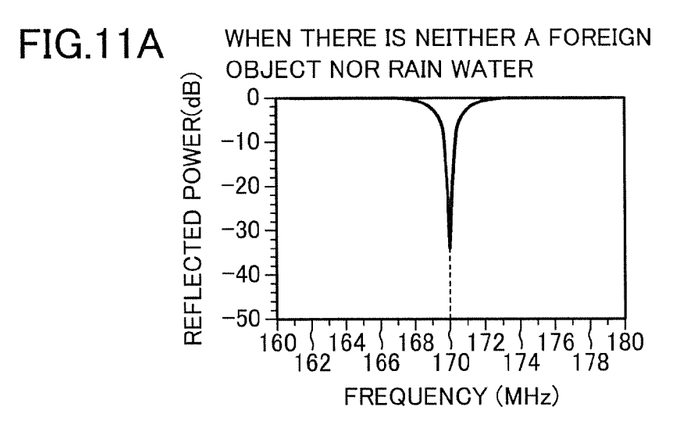
FIG. 11A illustrates a case where there is neither a foreign object nor rain.
Figure 11B:
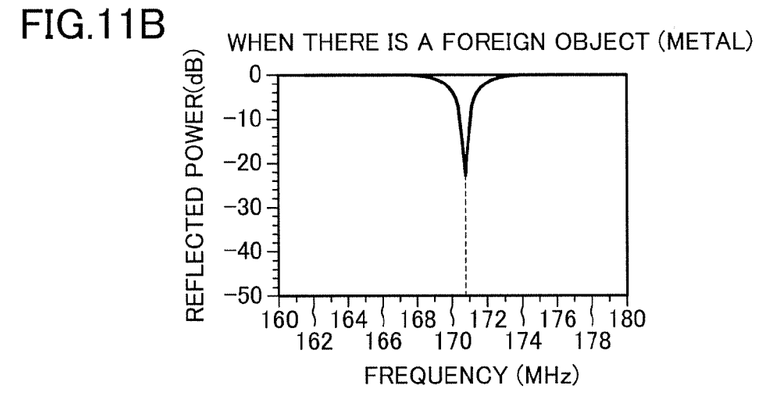
FIG. 11B illustrates a case where there is a foreign object (metal).
Figure 11C:
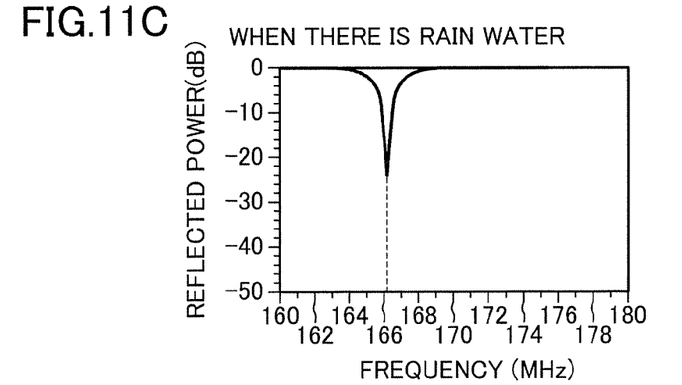
FIG. 11C illustrates a case where there is rainwater.

Now, the result of calculation will be shown. FIGS. 11A-11C illustrate the the frequency characteristic of the power reflected by the coil L1 when there is no mutual coupling between the respective detection coils 103. The matching frequency of FIG. 11B when there is a foreign object (metal) is higher than the reference matching frequency f0 of FIG. 11A when there is neither a foreign object nor rainwater. The matching frequency of FIG. 11C when there is rainwater is lower than the reference matching frequency f0 of FIG. 11A when there is neither a foreign object nor rainwater.

Figure 12A:
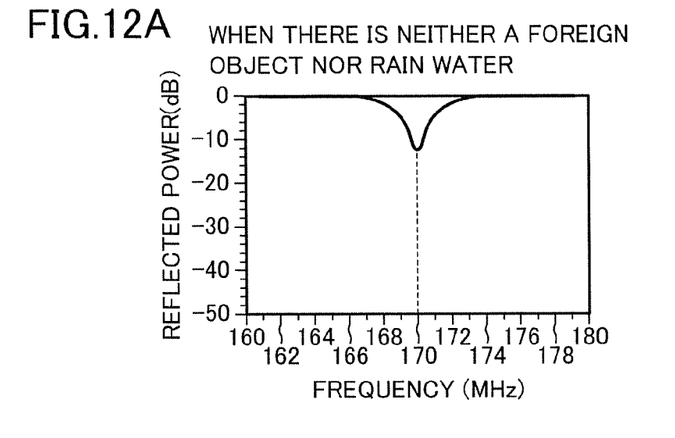
FIG. 12A illustrates a case where there is neither a foreign object nor rain.
Figure 12B:
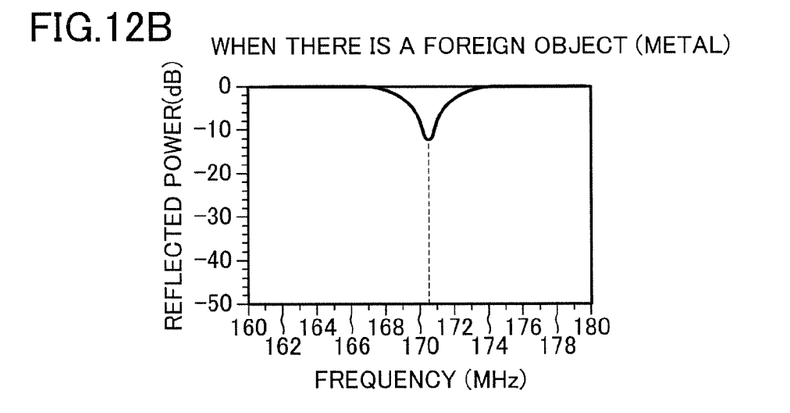
FIG. 12B illustrates a case where there is a foreign object (metal).
Figure 12C:
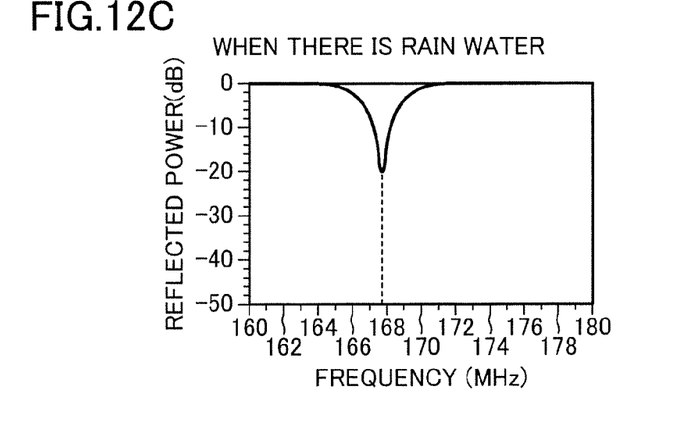
FIG. 12C illustrates a case where there is rainwater.

FIGS. 12A-12C illustrate the the frequency characteristic of the power reflected by the coil L1 when there is mutual coupling between the respective detection coils 103. The calculation was performed based on the assumption that the coupling coefficient k12 of a magnetic field between the coils L1 and L2 was $-0.1$. It can be seen that the amount of change in the matching frequency was smaller than those shown in FIGS. 11A-11C.

Figure 13A:
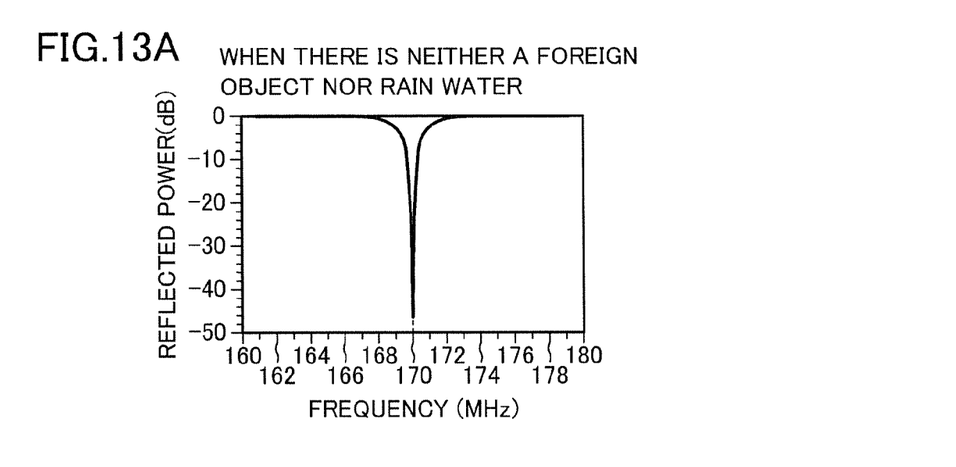
FIG. 13A illustrates a case where there is neither a foreign object nor rain.
Figure 13B:
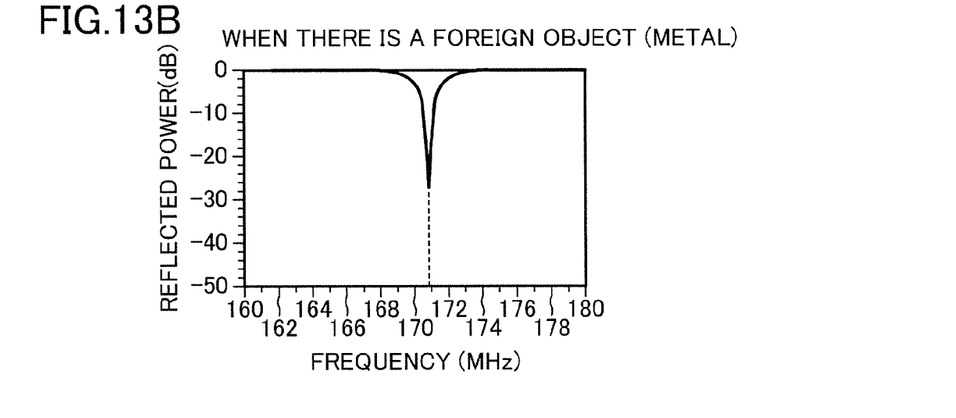
FIG. 13B illustrates a case where there is a foreign object (metal).
Figure 13C:
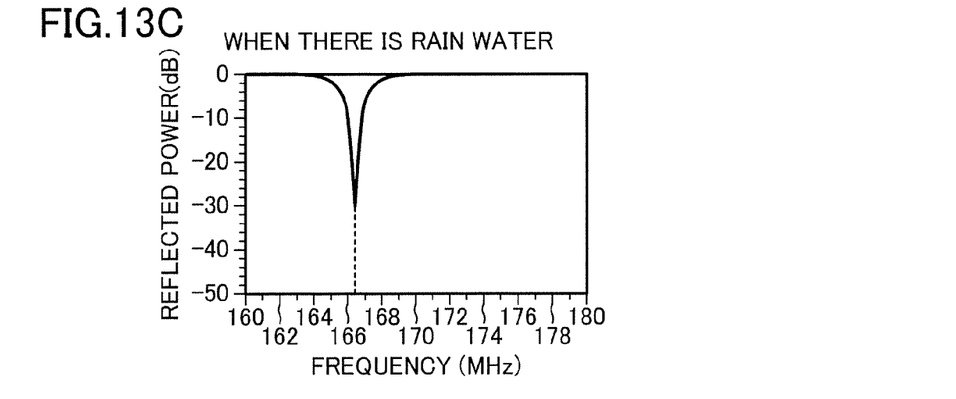
FIG. 13C illustrates a case where there is rainwater.

FIGS. 13A-13C illustrate the the frequency characteristic of the power reflected by the coil L1 when there is mutual coupling between the respective detection coils 103 and the short circuit 111 of the coil L2 is short-circuited. It can be seen that the amount of change in the matching frequency was almost equal to those shown in FIGS. 11A-11C.

Figure 14:
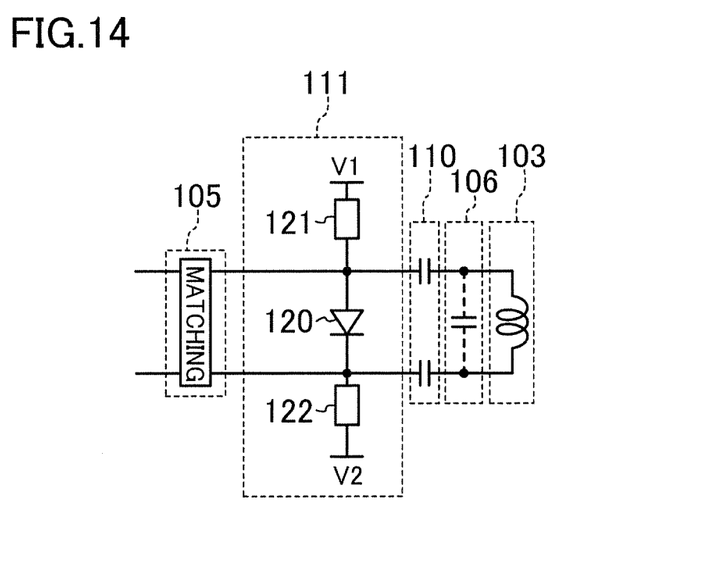
FIG. 14 is a circuit diagram illustrating a detailed exemplary configuration of the short circuit shown in FIG. 9.

FIG. 14 illustrates a short circuit 111 using a diode. A diode 120 is connected in parallel to both terminals of a detection coil 103. DC voltages V1 and V2 are applied to both terminals of the diode 120 via bias resistors 121 and 122, respectively. The potential difference between the DC voltages V1 and V2 is changed to switch the diode 120 between an ON state (short-circuited state) and an OFF state (opened state).

While both of the terminals of the detection coil 103 are supposed to be short-circuited together in the third embodiment, some capacitors of the matching circuit 105 in FIG. 10 may be short-circuited to cause impedance mismatch in the non-selected detection coils 103.

The foreign object detector and method of detecting a foreign object described above allow for detecting the foreign object while distinguishing metal from water. Even if the wire between a detection coil and a detection circuit is long, the accuracy in detecting a foreign object is maintained while preventing the wire from functioning as a linear antenna.

The foreign object detector and method of detecting a foreign object according to the present disclosure are applicable for use in a non-contact charger for mobile electronic devices, electric propulsion vehicles, and other devices and machines to be charged.

What is claimed is:

1. A foreign object detector comprising:
    a detection coil;
    a transmitting circuit generating an unbalanced signal;
    a coaxial cable transmitting the unbalanced signal generated by the transmitting circuit;
    a balanced-to-unbalanced transformer transforming the unbalanced signal supplied from the coaxial cable to a balanced signal, and outputting the balanced signal to the detection coil; and
    a detection circuit detecting a foreign object by sensing a change in a frequency characteristic of reflected power that is a power component reflected by the detection coil and transmitted through the balanced-to-unbalanced transformer and the coaxial cable, wherein
    the detection coil includes a plurality of coils, and
    the foreign object detector further comprises a short circuit in which both terminals of a non-selected one of the plurality of coils in the detection coil are short-circuited together.

2. The foreign object detector of claim 1, further comprising:
    a transmitting coil case housing a transmitting coil, wherein
    the detection coil is arranged above the transmitting coil, and housed in the transmitting coil case, and
    the detection coil is arranged such that a distance between a surface of the transmitting coil case and the detection coil is shorter than a distance between the transmitting coil and the detection coil.

3. A non-contact charging system comprising:
    the foreign object detector of claim 1;
    a transmitting coil; and
    an RF oscillation source supplying RF power of a predetermined frequency to the transmitting coil.

4. A method of detecting a foreign object, the method comprising:
    transmitting an unbalanced signal using a coaxial cable;
    transforming the unbalanced signal supplied from the coaxial cable to a balanced signal using a balanced-to-unbalanced transformer, and supplying power of the balanced signal to a detection coil; and
    detecting the foreign object by sensing a change in frequency characteristic of reflected power that is a power component reflected by the detection coil and transmitted through the balanced-to-unbalanced transformer and the coaxial cable, wherein
    the detection coil includes a plurality of coils, and
    the method further comprises a step in which both terminals of a non-selected one of the plurality of coils in the detection coil are short-circuited together.

\* \* \* \* \*